(12) United States Patent
Xepapas et al.

(10) Patent No.: US 8,743,525 B2
(45) Date of Patent: Jun. 3, 2014

(54) OVERVOLTAGE PROTECTION DEVICES INCLUDING WAFER OF VARISTOR MATERIAL

(75) Inventors: Fotis Xepapas, Drama (GR); Evaggelia Giannelaki, Drama (GR); Grigoris Kostakis, Athens (GR); Zafiris Politis, Athens (GR); Kostas Samaras, Athens (GR)

(73) Assignee: Raycap Intellectual Property, Ltd, Nicosia (CY)

( * ) Notice: Subject to any disclaimer, the term of this patent is extended or adjusted under 35 U.S.C. 154(b) by 77 days.

(21) Appl. No.: 13/552,240

(22) Filed: Jul. 18, 2012

(65) Prior Publication Data

US 2013/0335869 A1    Dec. 19, 2013

(30) Foreign Application Priority Data

Jun. 19, 2012  (GR) .............................. 120100325 A

(51) Int. Cl.
*H02H 9/06*          (2006.01)
(52) U.S. Cl.
USPC .......................................... 361/117; 361/120
(58) Field of Classification Search
USPC ........................................ 361/117–120, 127
See application file for complete search history.

(56) References Cited

U.S. PATENT DOCUMENTS

| | | |
|---|---|---|
| 1,144,029 A | 6/1915 | Creighton |
| 2,158,859 A | 5/1939 | Horikoshi |
| 2,311,758 A | 2/1943 | Johansson |
| 2,971,132 A | 2/1961 | Nash |
| 3,249,719 A | 5/1966 | Misare et al. |
| 3,522,570 A | 8/1970 | Wanaselja |
| 3,813,577 A | 5/1974 | Kawiecke |
| 4,015,228 A | 3/1977 | Eda et al. |
| 4,085,397 A | 4/1978 | Yagher, Jr. |
| 4,092,694 A | 5/1978 | Stetson |
| 4,240,124 A | 12/1980 | Westrom |
| 4,241,374 A | 12/1980 | Gilberts |
| 4,249,224 A | 2/1981 | Baumbach |
| 4,288,833 A | 9/1981 | Howell |

(Continued)

FOREIGN PATENT DOCUMENTS

| | | |
|---|---|---|
| CH | 466 427 A | 12/1968 |
| DE | 3428258 | 2/1986 |

(Continued)

OTHER PUBLICATIONS

Notification of Transmittal of the International Seerch Report and Written Opinion of the International Searching Authority iasued in corresponding PCT Application No. PCT/GR2013/000030, mailed Jul. 23, 2013 (12 pages).

(Continued)

*Primary Examiner* — Danny Nguyen
(74) *Attorney, Agent, or Firm* — Myers Bigel Sibley & Sajovec, PA

(57) ABSTRACT

An overvoltage protection device includes first and second electrically conductive electrode members and a varistor member formed of a varistor material and electrically connected with each of the first and second electrode members. The overvoltage protection device has an integral fail-safe mechanism operative to electrically short circuit the first and second electrode members about the varistor member by fusing first and second metal surfaces in the overvoltage protection device to one another using an electric arc.

35 Claims, 7 Drawing Sheets

(56) References Cited

U.S. PATENT DOCUMENTS

| | | | |
|---|---|---|---|
| 4,355,345 A * | 10/1982 | Franchet | 361/117 |
| 4,425,017 A | 1/1984 | Chan | |
| 4,493,003 A | 1/1985 | Mickelson et al. | |
| 4,595,635 A | 6/1986 | Dubrow et al. | |
| 4,600,261 A | 7/1986 | Debbaut | |
| 4,701,574 A | 10/1987 | Shimirak et al. | |
| 5,172,296 A | 12/1992 | Kaczmarek | |
| 5,311,164 A | 5/1994 | Ikeda et al. | |
| 5,519,564 A | 5/1996 | Carpenter | |
| 5,523,916 A | 6/1996 | Kaczmarek | |
| 5,529,508 A | 6/1996 | Chiotis et al. | |
| 5,588,856 A | 12/1996 | Collins et al. | |
| 5,652,690 A | 7/1997 | Mansfield et al. | |
| 5,721,664 A | 2/1998 | Uken et al. | |
| 5,781,394 A | 7/1998 | Lorenz et al. | |
| 5,808,850 A | 9/1998 | Carpenter, Jr. | |
| 5,936,824 A | 8/1999 | Carpenter, Jr. | |
| 6,038,119 A | 3/2000 | Atkins et al. | |
| 6,094,128 A | 7/2000 | Bennett et al. | |
| 6,172,865 B1 | 1/2001 | Boy et al. | |
| 6,175,480 B1 | 1/2001 | Karmazyn | |
| 6,430,019 B1 | 8/2002 | Martenson et al. | |
| 6,430,020 B1 | 8/2002 | Atkins et al. | |
| 6,614,640 B2 | 9/2003 | Richter et al. | |
| 7,433,169 B2 | 10/2008 | Kamel et al. | |
| 7,558,041 B2 | 7/2009 | Lagnoux | |
| 7,684,166 B2 | 3/2010 | Donati et al. | |
| 7,738,231 B2 | 6/2010 | Lagnoux | |
| 2002/0018331 A1 | 2/2002 | Takahashi | |
| 2004/0150937 A1 | 8/2004 | Bobert et al. | |
| 2008/0049370 A1 * | 2/2008 | Adachi et al. | 361/120 |
| 2011/0248816 A1 | 10/2011 | Duval et al. | |
| 2012/0086539 A1 | 4/2012 | Duval et al. | |
| 2012/0086540 A1 | 4/2012 | Duval et al. | |

FOREIGN PATENT DOCUMENTS

| | | |
|---|---|---|
| DE | 198 23 446 A1 | 11/1999 |
| DE | 19843519 | 4/2000 |
| EP | 0 108 518 | 5/1984 |
| EP | 0 203 737 | 12/1986 |
| EP | 0 335 479 | 10/1989 |
| EP | 0 445 054 | 9/1991 |
| EP | 0 603 428 A | 6/1994 |
| EP | 1 355 327 A2 | 10/2003 |
| EP | 1 458 072 A1 | 9/2004 |
| EP | 1 798 742 A1 | 6/2007 |
| FR | 2 574 589 A1 | 6/1986 |
| FR | 2 622 047 A1 | 4/1989 |
| JP | 60-187002 | 9/1985 |
| JP | 60-226103 | 11/1985 |
| JP | 60-258905 | 12/1985 |
| JP | 61-198701 | 9/1986 |
| JP | 1-176687 | 7/1989 |
| JP | 09-326546 | 12/1997 |
| JP | 2002-525861 | 8/2002 |
| JP | 2002-525862 | 8/2002 |
| SI | 9700277 A | 4/1999 |
| SI | 9700332 A | 6/1999 |
| SI | 20781 A | 6/2002 |
| SI | 20782 A | 6/2002 |
| SI | 22030 A | 10/2006 |
| WO | WO 88/00603 | 1/1988 |
| WO | WO 90/05401 | 5/1990 |
| WO | WO 95/15600 | 6/1995 |
| WO | WO 95/24756 | 9/1995 |
| WO | WO 97/42693 | 11/1997 |
| WO | WO 98/38653 | 9/1998 |
| WO | WO 00/17892 | 3/2000 |
| WO | WO 2007/117163 A1 | 10/2007 |
| WO | WO 2012/026888 A1 | 3/2012 |

OTHER PUBLICATIONS

Data Book Library 1997 Passive Components, Siemens Matsushita Components, 1997, pp. 15-17, 26-32, 36-37, 39, 161, 166, 167, 169, 171-174.

Raycap "Rayvoss™ Transient Voltage Surge Suppression System" webpage <http://www.raycap.com/surge/rayvoss.htm> accessed on Nov. 29, 2005, 1 page (updated).

Raycap "Revolutionary Lightning Protection Technology" Raycap Corporation Press Release, webpage <http://www.raycap.com/news/020930.htm> accessed on Nov. 29, 2005, 1 page (undated).

Rayvoss™ "The Ultimate Overvoltage Protection" webpage <http://www.rayvoss.com> accessed on Nov. 29, 2005, 2 pages, (undated).

Rayvoss™ "Applications" webpage <http://www.rayvoss.com/applications.htm> accessed on Nov. 29, 2005, 4 pages, (undated).

Rayvoss™ "Frequently Asked Questions" webpage <http://www.rayvoss.com/faq.htm> accessed on Nov. 29, 2005, 2 pages, (undated).

Rayvoss™ "Technical Information" webpage <http://www.rayvoss.com/tech_info.htm> accessed on Nov. 29, 2005, 3 pages, (undated).

Extended European Search Report in corressponding European Application No. 12177955.7 mailed Feb. 27, 2013 (7 pages).

Beitz et al. "Dubbel Tachenbuch für den Maschinenbau" (1997) 3 pages.

Oberg et al., "Machinery's Handbook 27$^{th}$ Edition—Soldering and Brazing" (2004) 4 pages.

Raycap "The Next Generation Surge Protection Rayvoss™" brochure, (May 4, 2012) 4 pages.

Raycap "The Ultimate Overvoltage Protection Rayvoss™" brochure, (2005) 4 pages.

Raycap "The Ultimate Overvoltage Protection Rayvoss™" brochure, (Jan. 2009) 4 pages.

Raycap "Strikesorb® 3D Series OEM Surge Suppression Solutions" brochure, (Apr. 17, 2009) 2 pages.

* cited by examiner

OVERVOLTAGE PROTECTION DEVICES INCLUDING WAFER OF VARISTOR MATERIAL

CROSS-REFERENCE TO RELATED APPLICATIONS

This U.S. non-provisional patent application claims the benefit of priority under 35 U.S.C. §119 of Greek Patent Application 20120100325, filed Jun. 19, 2012, the entire disclosure of which is hereby incorporated herein by reference in its entirety.

FIELD OF THE INVENTION

The present invention relates to voltage surge protection devices and, more particularly, to a voltage surge protection device including a varistor member.

BACKGROUND OF THE INVENTION

Frequently, excessive voltage is applied across service lines that deliver power to residences and commercial and institutional facilities. Such excess voltage or voltage spikes may result from lightning strikes, for example. The voltage surges are of particular concern in telecommunications distribution centers, hospitals and other facilities where equipment damage caused by voltage surges and resulting down time may be very costly.

Typically, one or more varistors (i.e., voltage dependent resistors) are used to protect a facility from voltage surges. Generally, the varistor is connected directly across an AC input and in parallel with the protected circuit. The varistor has a characteristic clamping voltage such that, responsive to a voltage increase beyond a prescribed voltage, the varistor forms a low resistance shunt path for the overvoltage current that reduces the potential for damage to the sensitive components. Typically, a line fuse may be provided in the protective circuit and this line fuse may be blown or weakened by the surge current or the failure of the varistor element.

Varistors have been constructed according to several designs for different applications. For heavy-duty applications (e.g., surge current capability in the range of from about 60 to 200 kA) such as protection of telecommunications facilities, block varistors are commonly employed. A block varistor typically includes a disk-shaped varistor element potted in an epoxy or plastic housing. The varistor disk is formed by pressure casting a metal oxide material, such as zinc oxide, or other suitable material such as silicon carbide. Copper, or other electrically conductive material, is flame sprayed onto the opposed surfaces of the disk. Ring-shaped electrodes are bonded to the coated opposed surfaces and the disk and electrode assembly is enclosed within the plastic housing. Examples of such block varistors include Product No. SIOV-B860K250, available from Siemens Matsushita Components GmbH & Co. KG and Product No. V271BA60, available from Harris Corporation.

Another varistor design includes a high-energy varistor disk housed in a disk diode case. The diode case has opposed electrode plates and the varistor disk is positioned therebetween. One or both of the electrodes include a spring member disposed between the electrode plate and the varistor disk to hold the varistor disk in place. The spring member or members provide only a relatively small area of contact with the varistor disk.

Another type of overvoltage protection device employing a varistor wafer is the Strikesorb™ surge protection module available from Raycap Corporation of Greece, which may form a part of a Rayvoss™ transient voltage surge suppression system. (See, for example, U.S. Pat. No. 6,038,119, U.S. Pat. No. 6,430,020 and U.S. Pat. No. 7,433,169.

Varistor-based overvoltage protection devices (e.g., of the epoxy-shielded type) are commonly designed with an open circuit failure mode using an internal thermal disconnector or overcurrent disconnector to disconnect the device in case of failure. Other varistor-based overvoltage protection devices have a short circuit as a failure mode. For example, some epoxy-shielded devices use a thermal disconnector to switch to a short circuit path. However, many of these devices have very limited short circuit current withstand capabilities.

SUMMARY OF THE INVENTION

According to embodiments of the present invention, an overvoltage protection device includes first and second electrically conductive electrode members and a varistor member formed of a varistor material and electrically connected with each of the first and second electrode members. The overvoltage protection device has an integral fail-safe mechanism operative to electrically short circuit the first and second electrode members about the varistor member by fusing first and second metal surfaces in the overvoltage protection device to one another using an electric arc.

According to some embodiments, the fail-safe mechanism is operative to electrically short circuit the first and second electrode members about the varistor member by fusing the first and second metal surfaces in response to a short circuit failure of the varistor member.

In some embodiments, the first and second metal surfaces are separated by a gap having a width in the range of from about 0.2 mm to 1 mm, and the electric arc extends across the gap to fuse the first and second metal surfaces.

According to some embodiments, the first and second metal surfaces are separated by a gap, the overvoltage protection device further includes an electrically insulating spacer member electrically isolating the first and second metal surfaces from one another, and the electric arc disintegrates the spacer member and extends across the gap to fuse the first and second metal surfaces. In some embodiments, the spacer member is formed of a polymeric material having a thickness in the range of from about 0.1 mm to 0.5 mm.

According to some embodiments, the first metal surface is a surface of the first electrode member and the second metal surface is a surface of the second electrode member. In some embodiments, the first electrode includes a housing having a metal housing sidewall and defining a housing chamber, the varistor member and at least a portion of the second electrode are disposed in the housing chamber, and the first metal surface is a surface of the housing sidewall. In some embodiments, the varistor member has first and second opposed, generally planar varistor contact surfaces, the housing includes an electrode wall having a first electrode contact surface engaging the first varistor contact surface, the second electrode includes a head positioned in the housing chamber, the head including a second electrode contact surface engaging the second varistor contact surface and a head peripheral surface surrounding the second electrode contact surface, and the second metal surface is located on the head peripheral surface. The overvoltage protection device may include a buffer chamber on a side of the head opposite the second electrode contact surface, wherein the buffer chamber is configured to limit propagation of electric arc away from the head.

The overvoltage protection device may include a biasing device biasing at least one of the first and second electrode members against the varistor member.

In some embodiments, the fail-safe mechanism is a first fail-safe mechanism and the overvoltage protection device further includes an integral second fail-safe mechanism. The second fail-safe mechanism includes an electrically conductive meltable member. The meltable member is responsive to heat in the overvoltage protection device to melt and form a current flow path between the first and second electrode members through the meltable member. In some embodiments, the overvoltage protection device further includes an electrically insulating spacer member electrically isolating the first and second metal surfaces from one another, and the meltable member has a greater melting point temperature than a melting point temperature of the spacer member. According to some embodiments, the first fail-safe mechanism is operative to fuse the first and second metal surfaces at a prescribed region, and the overvoltage protection device includes a sealing member between the prescribed region and the meltable member. According to some embodiments, the first fail-safe mechanism is operative to electrically short circuit the first and second electrode members about the varistor member by fusing the first and second metal surfaces in response to a short circuit failure of the varistor member sufficient to generate an arc, and the second fail-safe mechanism is operative to electrically short circuit the first and second electrode members about the varistor member in response to a short circuit failure of the varistor member not sufficient to generate an arc.

According to some embodiments, the fail-safe mechanism is a first fail-safe mechanism, the first fail-safe mechanism is operative to electrically short circuit the first and second electrode members about the varistor member by fusing the first and second metal surfaces in response to a short circuit failure of the varistor member, the overvoltage protection device further includes an integral second fail-safe mechanism, the second fail-safe mechanism including an electrically conductive meltable member, wherein the meltable member is responsive to heat in the overvoltage protection device to melt and form a current flow path between the first and second electrode members through the meltable member, the first fail-safe mechanism is operative to electrically short circuit the first and second electrode members about the varistor member by fusing the first and second metal surfaces in response to a short circuit failure of the varistor member sufficient to generate an arc, the second fail-safe mechanism is operative to electrically short circuit the first and second electrode members about the varistor member in response to a short circuit failure of the varistor member that is not sufficient to generate an arc, the varistor member has first and second opposed, generally planar varistor contact surfaces, the first electrode includes a housing defining a housing chamber and having a metal housing sidewall and an electrode wall, the electrode wall having a first electrode contact surface engaging the first varistor contact surface, the varistor member is disposed in the housing chamber, the second electrode includes a head positioned in the housing chamber, the head including a second electrode contact surface engaging the second varistor contact surface and a head peripheral surface surrounding the second electrode contact surface, the first metal surface is a surface of the housing sidewall, the second metal surface is located on the head peripheral surface, the first and second metal surfaces are separated by a gap having a width in the range of from about 0.2 mm to 1 mm, the overvoltage protection device further includes an electrically insulating spacer member electrically isolating the first and second metal surfaces from one another, the electric arc disintegrates the spacer member and extends across the gap to fuse the first and second metal surfaces, and the spacer member is formed of a polymeric material having a thickness in the range of from about 0.1 mm to 0.5 mm.

According to method embodiments of the present invention, a method for providing overvoltage protection includes providing an overvoltage protection device including: first and second electrically conductive, electrode members; a varistor member formed of a varistor material and electrically connected with each of the first and second electrode members; and an integral fail-safe mechanism operative to electrically short circuit the first and second electrode members about the varistor member by fusing the first and second metal surfaces in the overvoltage protection device to one another using an electric arc. The method further includes directing current between the first and second electrode members through the varistor member during an overvoltage event.

According to embodiments of the present invention, an overvoltage protection device includes first and second electrically conductive electrode members and a varistor member formed of a varistor material and electrically connected with each of the first and second electrode members. The overvoltage protection device has an integral first fail-safe mechanism configured to electrically short circuit the first and second electrode members about the varistor member when triggered by a first set of operating conditions. The overvoltage protection device also has an integral second fail-safe mechanism configured to electrically short circuit the first and second electrode members about the varistor member when triggered by a second set of operating conditions different from the first set of operating conditions.

According to some embodiments, the first and second sets of operating conditions each include at least one of an overheating event and an arcing event. In some embodiments, the first set of operating conditions includes an arcing event, and the second set of operating conditions includes an overheating event.

According to method embodiments of the present invention, a method for providing overvoltage protection includes providing an overvoltage protection device including: first and second electrically conductive electrode members; a varistor member formed of a varistor material and electrically connected with each of the first and second electrode members; an integral first fail-safe mechanism configured to electrically short circuit the first and second electrode members about the varistor member when triggered by a first set of operating conditions; and an integral second fail-safe mechanism configured to electrically short circuit the first and second electrode members about the varistor member when triggered by a second set of operating conditions different from the first set of operating conditions. The method further includes directing current between the first and second electrode members through the varistor member during an overvoltage event.

Further features, advantages and details of the present invention will be appreciated by those of ordinary skill in the art from a reading of the figures and the detailed description of the preferred embodiments that follow, such description being merely illustrative of the present invention.

BRIEF DESCRIPTION OF THE DRAWINGS

The accompanying drawings, which form a part of the specification, illustrate embodiments of the present invention.

DETAILED DESCRIPTION OF EMBODIMENTS OF THE INVENTION

Figure 1:
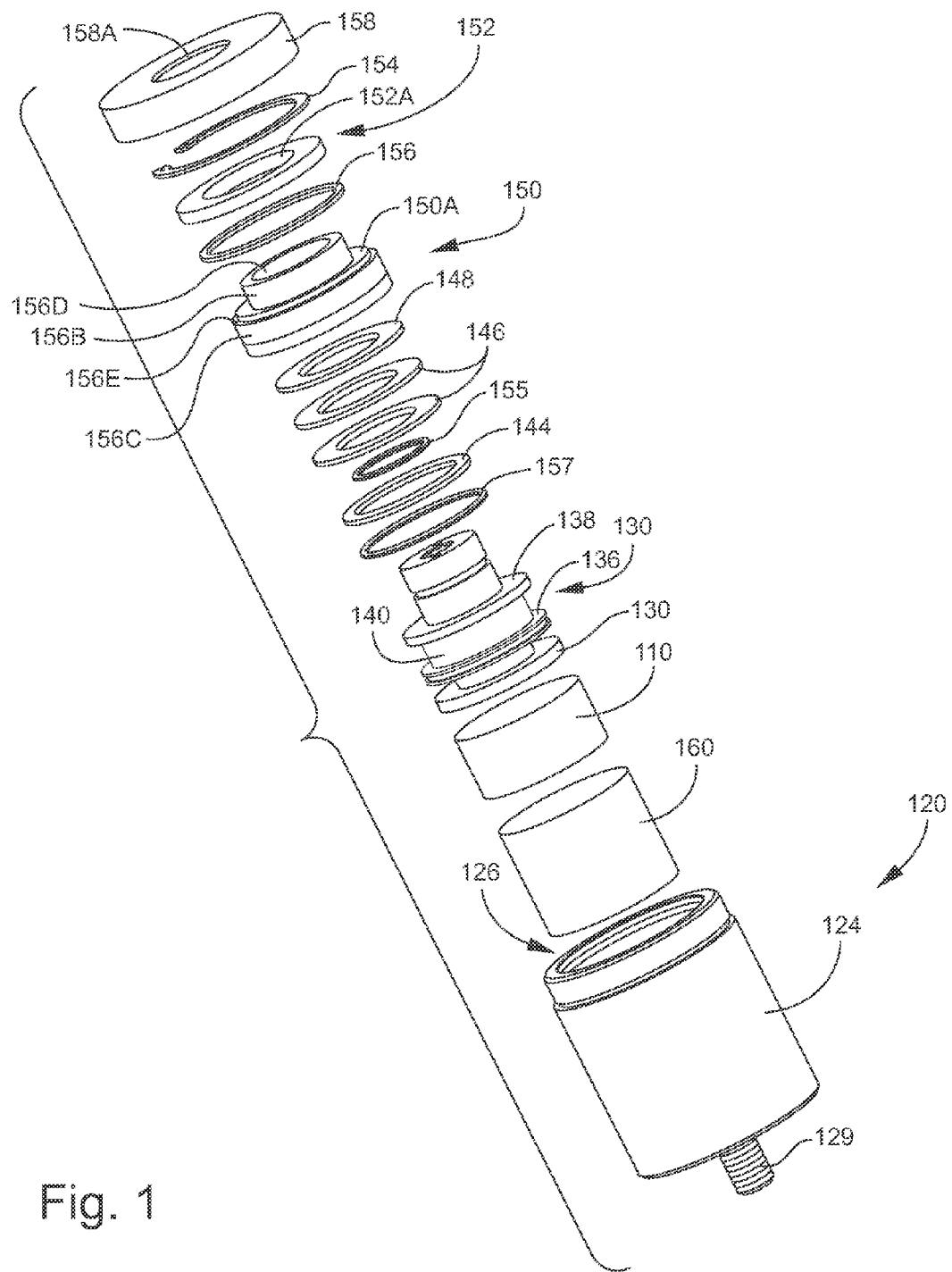
FIG. 1 is an exploded, perspective view of an overvoltage protection device according to embodiments of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

As used herein the expression "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, "monolithic" means an object that is a single, unitary piece formed or composed of a material without joints or seams.

As used herein, the term "wafer" means a substrate having a thickness which is relatively small compared to its diameter, length or width dimensions.

Figure 2:
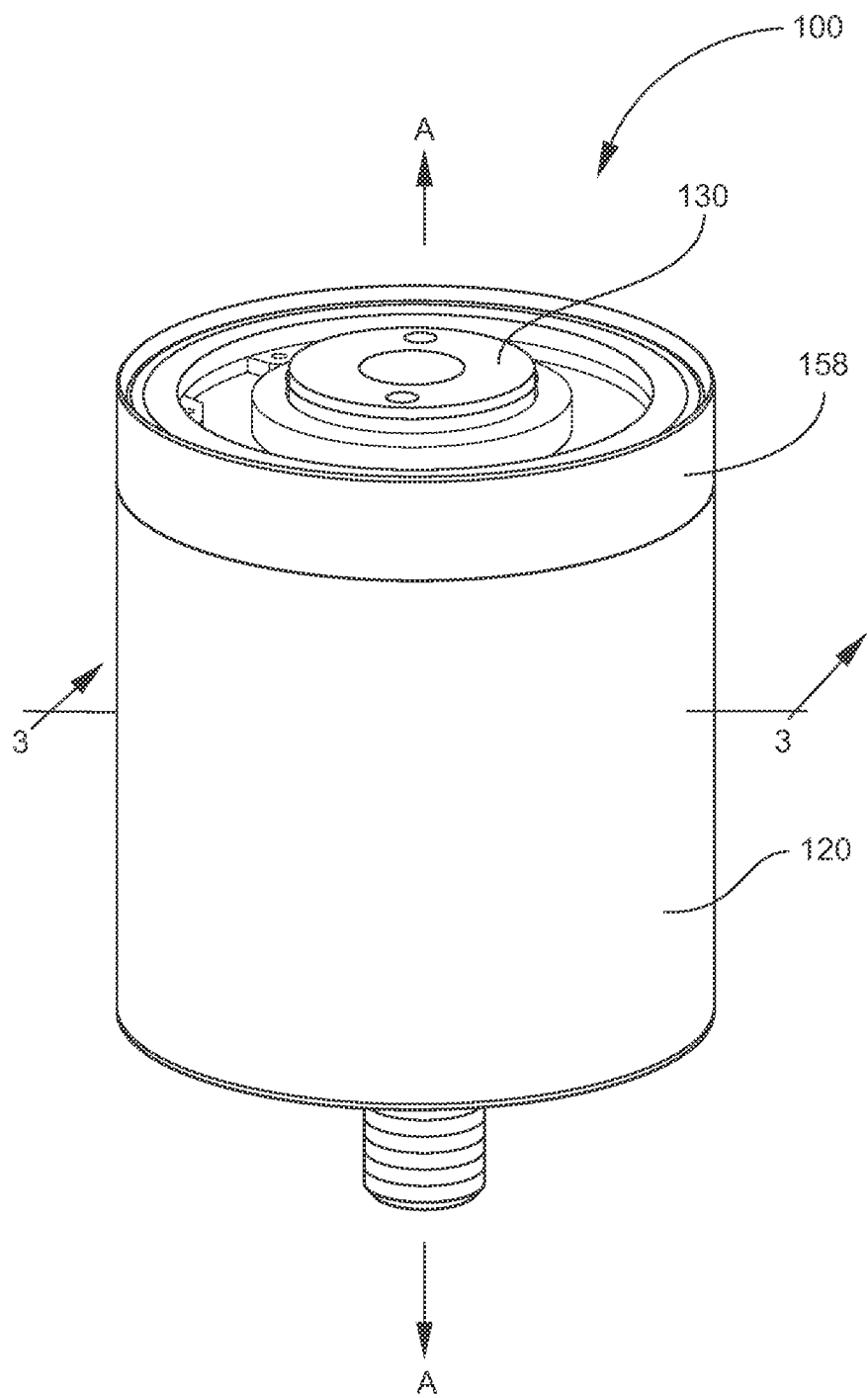
FIG. 2 is a perspective view of the overvoltage protection device of FIG. 1.

With reference to FIGS. 1-7, an overvoltage protection device according to embodiments of the present invention is shown therein and designated 100. The device 100 has a lengthwise axis A-A (FIG. 2). The device 100 includes a first electrode or housing 120, a piston-shaped second electrode 130, a varistor member (herein, "the varistor wafer") 110 between the housing 120 and the electrode 130, and other components as discussed in more detail below. The device 100 further includes an integral first fail-safe mechanism, arrangement, feature or system 161 and an integral second fail-safe mechanism, arrangement, feature or system 141. The fail-safe systems 141, 161 are each adapted to prevent or inhibit overheating or thermal runaway of the overvoltage protection device, as discussed in more detail below.

Figure 3:
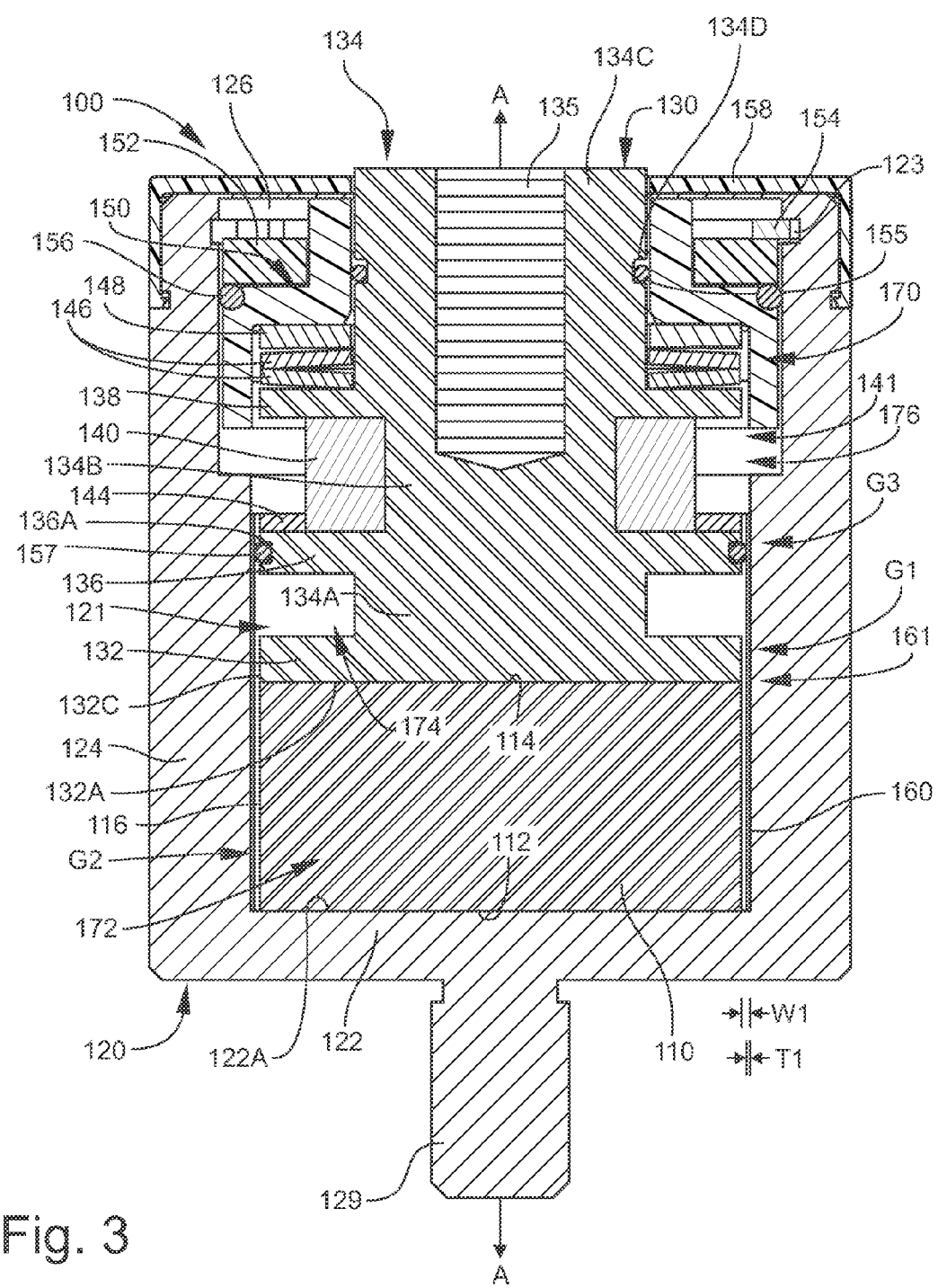
FIG. 3 is a cross-sectional view of the overvoltage protection device of FIG. 1 taken along the line 3-3 of FIG. 2.

With reference to FIGS. 1-3, the housing 120 has an end electrode wall 122 (FIG. 3) and a cylindrical sidewall 124 extending from the electrode wall 122. The sidewall 124 and the electrode wall 122 form a chamber or cavity 121 communicating with an opening 126. A threaded post or stud 129 extends outwardly from housing 120. The electrode 130 has a head 132 disposed in the cavity 121 and an integral shaft 134 that projects outwardly through the opening 126. The varistor wafer 110 is disposed in the cavity 121 between and in contact with each of the electrode wall 122 and the head 132.

In use, the device 100 may be connected directly across an AC or DC input (for example, in an electrical service utility box). Service lines are connected directly or indirectly to each of the electrode shaft 134 and the housing post 129 such that an electrical flow path is provided through the electrode 130, the varistor wafer 110, the housing electrode wall 122 and the housing post 129. Ordinarily, in the absence of an overvoltage condition, the varistor wafer 110 provides high electrical resistance such that no significant current flows through the device 100 as it appears electrically as an open circuit. In the event of an overvoltage condition (relative to the design voltage of the device), the resistance of the varistor wafer 110 decreases rapidly, allowing current to flow through the device 100 and create a shunt path for current flow to protect other components of an associated electrical system. The general use and application of overvoltage protectors such as varistor devices is well known to those of skill in the art and, accordingly, will not be further detailed herein.

Turning to the construction of the device 100 in greater detail, the first fail-safe system 161 includes an electrically insulating spacer member or membrane 160 disposed in the cavity 121. The second fail-safe system 141 includes an electrically conductive meltable member 140 and a meltable member insulating ring 144 disposed in the cavity 121. The device 100 further includes spring washers 146, a flat washer 148, an insulating member 150, an end cap 152, a clip 154, an O-ring 155, an O-ring 156, an O-ring 157, and a cover 158 over the cavity 121. Each of these components is described more fully below.

The electrode wall 122 of the housing 120 has an inwardly facing, substantially planar contact surface 122A. An annular slot 123 is formed in the inner surface of the sidewall 124. According to some embodiments, the housing 120 is formed of aluminum. However, any suitable electrically conductive metal may be used. According to some embodiments, the housing 120 is unitary and, in some embodiments, monolithic. The housing 120 as illustrated is cylindrically shaped, but may be shaped differently.

As best seen in FIG. 3, the head 132 of the electrode 130 has a substantially planar contact surface 132A that faces the contact surface 122A of the electrode wall 122. A circumferential peripheral sidewall surface 132C surrounds the contact surface 132A. The shaft 134 has a lower portion 134A, an intermediate portion 134B, and an upper portion 134C. According to some embodiments, each shaft portion 134A, 134B, 134C has a diameter of from about 0.79 to 1 inch. An integral, annular, lower flange 136 extends radially outwardly from the shaft 134 between the shaft portions 134A and 134B. An integral, annular, upper flange 138 extends radially outwardly from the shaft 134 between the shaft portions 134B and 134C. An annular, sidewardly opening groove 136A is defined in the peripheral sidewall of the flange 136. A threaded bore 135 is formed in the end of the shaft 134 to receive a bolt for securing a bus bar or other electrical connector to the electrode 130. An annular, sidewardly opening groove 134D is defined in the shaft portion 134C.

According to some embodiments, the electrode 130 is formed of aluminum and, in some embodiments, the housing sidewall 124 and the electrode 130 are both formed of aluminum. However, any suitable electrically conductive metal may be used. According to some embodiments, the electrode 130 is unitary and, in some embodiments, monolithic.

An annular gap G1 is defined between the head peripheral sidewall surface 132C and the nearest adjacent surface of the sidewall 124. A gap G2 is defined between the varistor 110 and the nearest adjacent surface of the sidewall 124. A gap G3 is defined between the lower flange 136 and the nearest adjacent surface of the sidewall 124. There may be a gap defined between the membrane 160 and the surface 132C and/or the sidewall 124, as shown for example. Alternatively, the membrane 160 may be substantially in contact with surface 132C and the sidewall 124 (i.e., the gaps G2, G3 may be substantially completely filled by the membrane 160).

According to some embodiments, each gap G1, G2, G3 has a width W1 (FIG. 3) in the range of from about 0.2 to 1 mm and, in some embodiments, in the range of from about 0.5 to 0.75 mm.

With reference to FIG. 3, the housing 120 and the end cap 152 collectively define an enclosed device chamber 170. A varistor subchamber 172 is defined by the head 132, the electrode wall 122 and a portion of the sidewall 124. An extinguishing or buffer subchamber 174 is defined by the head 132, the flange 136 and a portion of the sidewall 124. A meltable member subchamber 176 is defined by the flange 136, the flange 138 and a portion of the sidewall 124.

The membrane 160 is mounted around the electrode 130 between the electrode 130 and the sidewall 124 in the chamber 170. The membrane 160 is annular and surrounds the varistor 110, the head 132, the lower shaft portion 134A, and the lower flange 136. In some embodiments and as shown, the membrane 160 is a relatively thin, cylindrical, tubular piece or sleeve. The membrane 160 is interposed radially between the sidewall 124 and each of the varistor 110, the head peripheral sidewall surface 132C, and the flange 136. Except as discussed below, the membrane 160 electrically isolates the electrode 130 from the housing 120. According to some embodiments, the membrane 160 contacts the sidewall 124.

The membrane 160 is formed of a dielectric or electrically insulating material having high melting and combustion temperatures, but which can be disintegrated (such as by melting, burning, combusting or vaporizing) when subjected to an electric arc or the high temperatures created by an electric arc. According to some embodiments, the membrane 160 is formed of a high temperature polymer and, in some embodiments, a high temperature thermoplastic. In some embodiments, the membrane 160 is formed of polyetherimide (PEI), such as ULTEM™ thermoplastic available from SABIC of Saudi Arabia. In some embodiments, the membrane 160 is formed of non-reinforced polyetherimide.

According to some embodiments, the membrane 160 is formed of a material having a melting point greater than the melting point of the meltable member 140. According to some embodiments, the membrane 160 is formed of a material having a melting point in the range of from about 120 to 200° C. and, according to some embodiments, in the range of from about 140 to 160° C.

According to some embodiments, the membrane 160 material can withstand a voltage of 25 kV per mm of thickness.

According to some embodiments, the membrane 160 has a thickness T1 (FIG. 3) in the range of from about 0.1 to 0.5 mm and, in some embodiments, in the range of from about 0.3 to 0.4 mm.

The meltable member 140 is mounted on the electrode 130 in the subchamber 176. The meltable member 140 is annular and surrounds the intermediate shaft portion 134B, which is disposed in a central passage of the meltable member 140. In some embodiments and as shown, the meltable member 140 is a cylindrical, tubular piece or sleeve. According to some embodiments, the meltable member 140 contacts the intermediate shaft portion 134B and, according to some embodiments, the meltable member 140 contacts the intermediate shaft portion 134B along substantially the full length of the intermediate shaft portion 134B and the full length of the meltable member 140. The meltable member 140 also engages the lower surface of the flange 138 and the top surface of the flange 136. The meltable member 140 is spaced apart from the sidewall 124 a distance sufficient to electrically isolate the meltable member 140 from the sidewall 124.

The meltable member 140 is formed of a heat-meltable, electrically conductive material. According to some embodiments, the meltable member 140 is formed of metal. According to some embodiments, the meltable member 140 is formed of an electrically conductive metal alloy. According to some embodiments, the meltable member 140 is formed of a metal alloy from the group consisting of aluminum alloy, zinc alloy, and/or tin alloy. However, any suitable electrically conductive metal may be used.

According to some embodiments, the meltable member 140 is selected such that its melting point is greater than a prescribed maximum standard operating temperature. The maximum standard operating temperature may be the greatest temperature expected in the meltable member 140 during normal operation (including handling overvoltage surges within the designed for range of the device 100) but not during operation which, if left unchecked, would result in thermal runaway. According to some embodiments, the meltable member 140 is formed of a material having a melting point in the range of from about 80 to 160° C. and, according to some embodiments, in the range of from about 80 to 120° C. According to some embodiments, the melting point of the meltable member 140 is at least 20° C. less than the melting points of the housing 120, the electrode 130, the insulator ring 150, and the membrane 160 and, according to some embodiments, at least 40° C. less than the melting points of those components.

According to some embodiments, the meltable member 140 has an electrical conductivity in the range of from about $0.5 \times 10^6$ Siemens/meter (S/m) to $4 \times 10^7$ S/m and, according to some embodiments, in the range of from about $1 \times 10^6$ S/m to $3 \times 10^6$ S/m.

The meltable member 140 can be mounted on the electrode 130 in any suitable manner. According to some embodiments, the meltable member 140 is cast or molded onto the electrode 130. According to some embodiments, the meltable member 140 is mechanically secured onto the electrode 130. According to some embodiments, the meltable member 140 is unitary and, in some embodiments, monolithic.

The varistor wafer 110 has first and second opposed, substantially planar contact surfaces 112. The varistor wafer 110 is interposed between the contact surfaces 122A and 132A. As described in more detail below, the head 132 and the wall 122 are mechanically loaded against the varistor wafer 110 to ensure firm and uniform engagement between the surfaces 132A, 122A and the respective opposed surfaces 112, 114 of the varistor wafer 110.

The varistor wafer 110 has a circumferential, peripheral sidewall surface 116. According to some embodiments, the varistor wafer 110 is disk-shaped. However, the varistor wafer 110 may be formed in other shapes. The thickness and the diameter of the varistor wafer 110 will depend on the varistor characteristics desired for the particular application. The varistor wafer 110 may include a wafer of varistor material coated on either side with a conductive coating so that the exposed surfaces of the coatings serve as the contact surfaces. The coatings can be formed of aluminum, copper or silver, for example.

The varistor material may be any suitable material conventionally used for varistors, namely, a material exhibiting a nonlinear resistance characteristic with applied voltage. Preferably, the resistance becomes very low when a prescribed voltage is exceeded. The varistor material may be a doped metal oxide or silicon carbide, for example. Suitable metal oxides include zinc oxide compounds.

The spring washers 146 surround the upper shaft portion 134B and engage the upper surface of the flange 138. Each spring washer 146 includes a hole that receives the upper shaft portion 134C of the electrode 130. The lowermost spring washer 146 abuts the top face of the flange 138. According to some embodiments, the clearance between the spring washer hole and the shaft portion 134C is in the range of from about 0.015 to 0.035 inch. The spring washers 146 may be formed of a resilient material. According to some embodiments and as illustrated, the spring washers 146 are Belleville washers formed of spring steel. While two spring washers 146 are shown, more or fewer may be used.

The flat metal washer 148 is interposed between the spring washer 146 and the insulator ring 150 with the shaft portion 134C extending through a hole formed in the washer 148. The washer 148 serves to distribute the mechanical load of the spring washer 146 to prevent the spring washer from cutting into the insulator ring 150.

The insulator ring 150 overlies and abuts the washer 148. The insulator ring 150 has a main body ring 150A, a cylindrical upper flange or collar 150B extending upwardly from the main body ring 150A, and a cylindrical lower flange or collar 150C extending downwardly from the main body ring 150A. A hole 150D receives the shaft portion 134B. According to some embodiments, the clearance between the hole 150D and the shaft portion 134B is in range of from about 0.025 to 0.065 inch. The main body ring 150A and the collars 150B, 150O may be bonded or integrally molded. An upwardly and outwardly opening peripheral groove 150E is formed in the top corner of the main body ring 150A.

The insulator ring 150 is preferably formed of a dielectric or electrically insulating material having high melting and combustion temperatures. The insulator ring 150 may be formed of polycarbonate, ceramic or a high temperature polymer, for example. According to some embodiments, the insulator ring 150 is formed of a material having a melting point greater than the melting point of the meltable member 140.

The end cap 152 overlies and abuts the insulator ring 150. The end cap 152 has a hole 152A that receives the shaft portion 134C. According to some embodiments, the clearance between the hole 152A and the shaft portion 134C is in the range of from about 0.1 to 0.2 inch. The end cap 152 may be formed of aluminum, for example.

The clip 154 is resilient and truncated ring shaped. The clip 154 is partly received in the slot 123 and partly extends radially inwardly from the inner wall of the housing 120 to limit outward axial displacement of the end cap 152. The clip 154 may be formed of spring steel.

The cover 158 is configured to cover the end cap 152 and has a hole 158A through which the shaft 134 extends. The cover 158 is formed of an electrically insulating material and serves to insure a desired creepage distance between the electrode 130 and the end cap 152 or housing 120.

The cover 158 may be formed of any suitable electrically insulating material having a sufficiently high melting temperature. The cover 158 may be formed of polycarbonate, ceramic or a high temperature polymer, for example. According to some embodiments, the cover 158 is formed of a material having a melting point greater than the melting point of the meltable member 140.

The O-ring 155 is positioned in the groove 134D so that it is captured between the shaft 134 and the insulator ring 150. The O-ring 156 is positioned in the groove 159 such that it is captured between the end cap 152 and the insulator ring 150. The O-ring 157 is positioned in the groove 136A such that it is captured between the flange 136 and the sidewall 124. When installed, the O-rings 156, 157 are compressed so that they are biased against and form a seal between the adjacent interfacing surfaces. In an overvoltage event, byproducts such as hot gases and fragments from the wafer 110 may fill or scatter into the cavity chamber 170. These byproducts may be constrained or prevented by the O-rings 156, 157 from escaping the overvoltage protection device 100 through the housing opening 126.

The O-rings 155, 156, 157 may be formed of the same or different materials. According to some embodiments, the O-rings 155, 156, 157 are formed of a resilient material, such as an elastomer. According to some embodiments, the O-rings 155, 156, 157 are formed of rubber. The O-rings 155, 156, 157 may be formed of a fluorocarbon rubber such as VITON™ available from DuPont. Other rubbers such as butyl rubber may also be used. According to some embodiments, the rubber has a durometer of between about 60 and 100 Shore A. According to some embodiments, the melting point of each of the O-rings 155, 156, 157 is greater than the melting point of the meltable member 140.

When assembled as shown in FIGS. 2 and 3, the O-ring 157 seals the subchambers 172, 174 containing the varistor 110, and the O-rings 155, 156 and 157 seal the subchamber 174 containing the meltable member 140.

As noted above and as best shown in FIG. 3, the electrode head 132 and the electrode wall 122 are persistently biased or loaded against the varistor wafer 110 to ensure firm and uniform engagement between the wafer surfaces 112, 114 and the surfaces 122A, 132A. This aspect of the device 100 may be appreciated by considering a method according to the present invention for assembling the device 100. The O-rings 156, 157 are installed in the grooves 150E, 136A. The meltable member 140 is mounted on the shaft portion 134B using any suitable technique (e.g., casting). The varistor wafer 110 is placed in the cavity 121 such that the wafer surface 112 engages the contact surface 122A. The electrode 130 is inserted into the cavity 121 such that the contact surface 132A engages the varistor wafer surface 114. The spring washers 146 are slid down the shaft portion 134C and placed over the flange 138. The washer 148, the insulator ring 150, and the end cap 152 are slid down the shaft portion 134C and over the spring washers 146. A jig (not shown) or other suitable device is used to force the end cap 152 down, in turn deflecting the spring washers 146. While the end cap 152 is still under the load of the jig, the clip 154 is compressed and inserted into the slot 123. The clip 154 is then released and allowed to return to its original diameter, whereupon it partly fills the slot and partly extends radially inward into the cavity 121 from the slot 123. The clip 154 and the slot 123 thereby serve to maintain the load on the end cap 152 to partially deflect the spring washers 146. The loading of the end cap 152 onto the insulator ring 150 and from the insulator ring onto the spring washer 146 is in turn transferred to the head 132. In this way, the varistor wafer 110 is sandwiched (clamped) between the head 132 and the electrode wall 122. The cover 158 is installed over the end cap 152.

The varistor 110 may be constructed and operate in conventional or known, or similar, manner. As is well known, a varistor has an innate nominal clamping voltage VNOM (sometimes referred to as the "breakdown voltage" or simply the "varistor voltage") at which the varistor begins to conduct current. Below the VNOM, the varistor will not pass current. Above the VNOM, the varistor will conduct a current (i.e., a leakage current or a surge current). The VNOM of a varistor is typically specified as the measured voltage across the varistor with a DC current of 1 mA.

As is well known, a varistor has three modes of operation. In a first normal mode, up to a nominal voltage, the varistor is practically an electrical insulator. In a second normal mode, when the varistor is subjected to an overvoltage, the varistor temporarily and reversibly becomes an electrical conductor during the overvoltage condition and returns to the first mode thereafter. In a third mode (the so-called end of life mode), the varistor is effectively depleted and becomes a permanent, non-reversible electrical conductor.

The varistor 110 also has an innate maximum clamping voltage VC (sometimes referred to as simply the "clamping voltage"). The maximum clamping voltage VC is defined as the maximum voltage measured across the varistor when a specified current is applied to the varistor over time according to a standard protocol.

As discussed above, in the absence of an overvoltage condition, the varistor wafer 110 provides high resistance such that no current flows through the device 100 as it appears electrically as an open circuit. That is, ordinarily the varistor 110 passes no current. The electrodes 130 and the housing are electrically isolated from one another by the varistor 110, the gaps G1, G2, G3, the membrane 160, the insulator ring 150 and the cover 158. In the event of an overcurrent surge event (typically transient; e.g., lightning strike) or an overvoltage condition or event (typically longer in duration than an overcurrent surge event) exceeding VNOM, the resistance of the varistor wafer decreases rapidly, allowing current to flow through the device 100 and create a shunt path for current flow to protect other components of an associated electrical system. Normally, the varistor 110 recovers from these events without significant overheating of the device 100.

The VNOM of a given varistor begins at a certain value and over time could degrade to a lower effective VNOM value as a result of varistor aging. Typically, a varistor is initially rated for a "maximum continuous operating voltage" (MCOV), indicating that the VNOM of the varistor exceeds the rated MCOV when first placed in service. For example, the rated MCOV of a selected varistor may be 1500V, but may drop to 1300V due to aging.

Varistor aging (i.e., degradation resulting in reduction of the VNOM) can be caused by surge currents or continuous leakage currents (during continuous overvoltage events) applied to the varistor in service, as well as by passage of time with the nominal voltage applied on the varistor (rare case, typically caused by low quality varistors). Aging degradation is generally thermally induced.

Varistors have multiple failure modes. These failure modes may be caused by aging or a surge of sufficient magnitude and duration. The failure modes include: 1) the varistor 110 fails as a short circuit; and 2) the varistor 110 fails as a linear resistance (aging of the varistor). A short circuit failure typically manifests as a localized pinhole or puncture site (herein, "the failure site") extending through the thickness of the varistor 110. This failure site creates a path for current flow between the two electrodes of a low resistance, but high enough to generate ohmic losses and cause overheating of the device 100 even at low fault currents. Sufficiently large fault current through the varistor 110 can melt the varistor in the region of the failure site and generate an electric arc. A varistor failure as a linear resistance will cause the conduction of a limited current through the varistor that will result in a buildup of heat. This heat buildup may result in catastrophic thermal runaway and the device temperature may exceed a prescribed maximum temperature. For example, the maximum allowable temperature for the exterior surfaces of the device may be set by code or standard to prevent combustion of adjacent components. In some cases, the current through the failed varistor could also be limited by the power system itself (e.g., ground resistance in the system or in photo-voltaic (PV) power source applications where the fault current depends on the power generation capability of the system at the time of the failure) resulting in a progressive build up of temperature, even if the varistor failure is a short circuit. There are cases where there is a limited leakage current flow through the varistor due to extended in time overvoltage conditions due to power system failures, for example. These conditions may lead to temperature build up in the device, such as when the varistor has failed as a linear resistance and could possibly lead to the failure of the varistor either as a linear resistance or as a short circuit as described above.

One way to avoid such thermal runaway is to interrupt the current through the device 100 using a fuse that blows prior to the occurrence of overheat in the device 100. However, as discussed below, in some cases this approach is undesirable as it may cause damage to other important components in an associated circuit or leave the load unprotected after disconnecting the surge protective device. In addition, in some applications the current could be lower than the rating of the fuse.

In some cases, the device 100 may assume an "end of life" mode in which the varistor wafer is depleted in full or in part (i.e., in an "end of life" state), leading to an end of life failure. When the varistor 110 of the device 100 reaches its end of life, the device 100 will become substantially a short circuit with a very low but non-zero ohmic resistance.

As a result, in an end of life condition, a fault current will continuously flow through the varistor 110 even in the absence of an overvoltage condition. As a result, notwithstanding the short circuit provided by the end of life device 100, the fault current may be insufficient to trip or blow an associated breaker or fuse. In this case, the current may continue to flow through the varistor 110, thereby generating heat from ohmic losses in the varistor 110. If the condition is permitted to persist, the heat generated in the device 100 may build up until the housing 120 melts or explodes. Such an event may be regarded as catastrophic. If the fault current is of sufficient magnitude, the fault current will induce or generate electric arcing through and around the varistor 110 (herein, an "arcing event"). Such an arcing event may rapidly generate additional heat in the device 100 and/or may cause localized damage to other components of the device 100.

The first fail-safe system 161 and the second fail-safe system 141 are each adapted and configured to electrically short circuit the current applied to the device 100 around the varistor 110 to prevent or reduce the generation of heat in the varistor. In this way, the fail-safe systems 141, 161 can operate as switches to bypass the varistor 110 and prevent overheating and catastrophic failure as described above. According to embodiments of the invention, the fail-safe systems 141, 161 operate independently of one another. More particularly, in some embodiments, the fail-safe system 161 will operate to short circuit the device 100 when a first type or set of operating conditions are experienced by the device 100 and the fail-safe system 141 will operate to short circuit the device 100 when a second type or set of operating conditions, different from the first, are experienced by the device 100. That is, under different circumstances, the fail-safe system 161 may operate or execute first or the fail-safe system 141 may operate or execute first. Ordinarily, though not necessarily, only one of the fail-safe systems will execute, whereupon the conditions necessary to invoke the other fail-safe system will be prevented from arising.

The operation of the fail-safe systems 141, 161 will be described in more detail hereinbelow. As used herein, a fail-safe system is "triggered" upon occurrence of the conditions necessary to cause the fail-safe system to operate as described to short circuit the electrodes 120, 130.

Turning to the fail-safe system 141 in more detail, when heated to a threshold temperature, the meltable member 140 will flow to bridge and electrically connect the electrodes 120, 130. The meltable member 140 thereby redirects the current applied to the device 100 to bypass the varistor 110 so that the current induced heating of the varistor 110 ceases. The fail-safe system 141 may thereby serve to prevent or inhibit thermal runaway without requiring that the current through the device 100 be interrupted.

Figure 4:
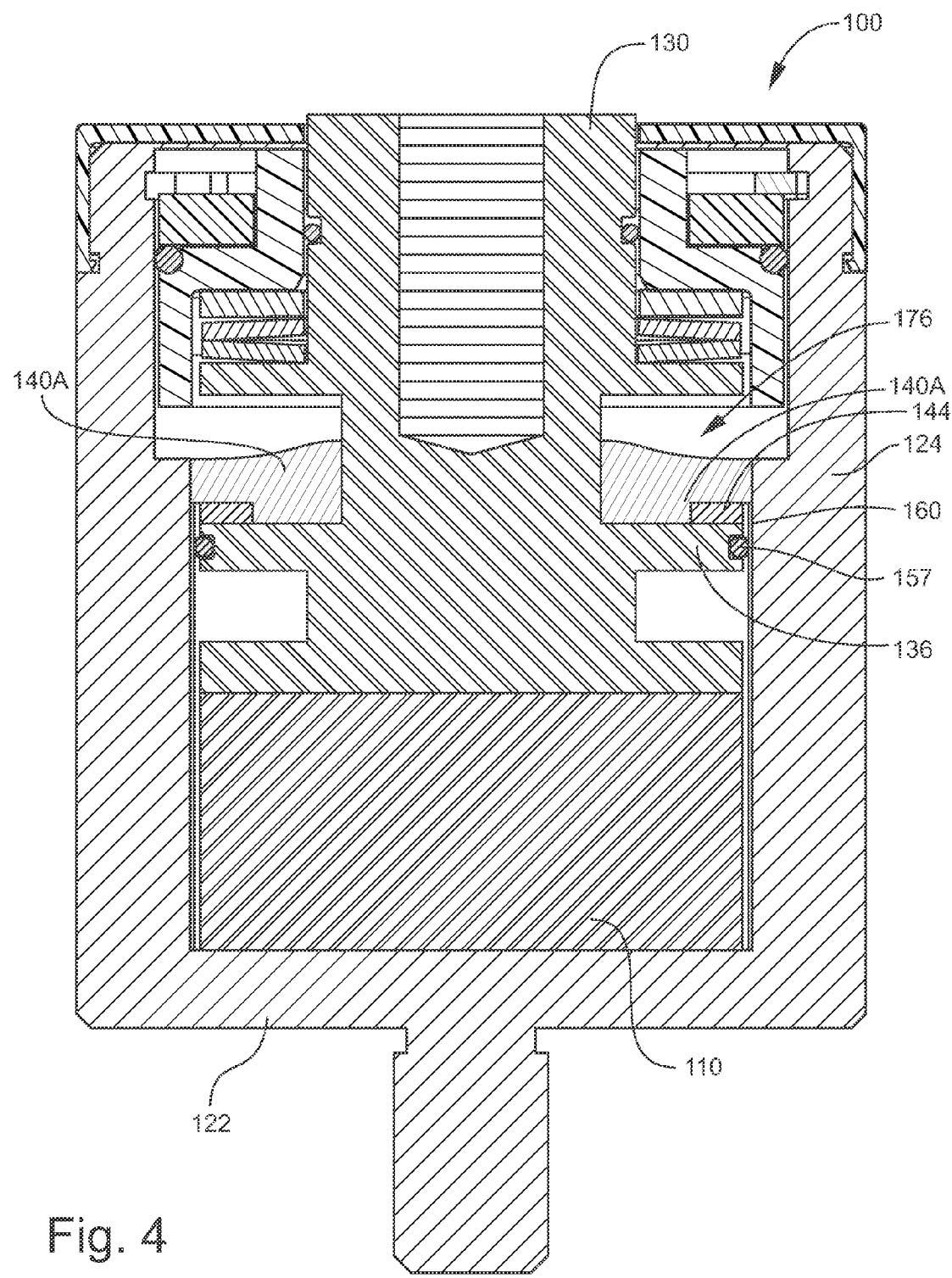
FIG. 4 is a cross-sectional view of the overvoltage protection device of FIG. 1 taken along the line 3-3 of FIG. 2, wherein a meltable member of the overvoltage protection device has been reconfigured by melting to bypass the varistor wafer.

More particularly, the meltable member 140 initially has a first configuration as shown in FIGS. 1 and 3 such that it does not electrically couple the electrode 130 and the housing 120 except through the head 132. Upon the occurrence of a heat buildup event, the electrode 130 is thereby heated. The meltable member 140 is also heated directly and/or by the electrode 130. During normal operation, the temperature in the meltable member 140 remains below its melting point so that the meltable member 140 remains in solid form. However, when the temperature of the meltable member 140 exceeds its melting point, the meltable member 140 melts (in full or in part) and flows by force of gravity into a second configuration different from the first configuration. When the device 100 is vertically oriented, the melted meltable member 140 accumulates in the lower portion of the subchamber 176 as a reconfigured meltable member 140A (which may be molten in whole or in part) as shown in FIG. 4. The meltable member 140A bridges or short circuits the electrode 130 to the housing 120 to bypass the varistor 110. That is, a new direct flow path or paths are provided from the surface of the electrode portion 134B to the surfaces of the housing sidewall 124 through the meltable member 140A. According to some embodiments, at least some of these flow paths do not include the varistor wafer 110.

The reconfigured meltable member 140A is typically contained in the chamber 176. The insulating ring 144 is positioned in the chamber 176 to provide a better flow path for the meltable member 140. More particularly, the insulating ring 144 serves as a spacer to direct the flow of the molten member 140 over the upper end section of the membrane 160. If the molten member 140 were permitted to flow directly into the membrane 160, the membrane 160 may prevent or jeopardize a quick and reliable engagement between the member 140 and the sidewall 124. The membrane 160 may extend above the top edge of the flange 136 in order to provide sufficient electrical creepage distance between the flange 136 and the sidewall 124.

According to some embodiments, the fail-safe system 141 can be triggered by at least two alternative triggering sets of operating conditions, as follows.

The fail-safe system 141 can be triggered by heat generated in the varistor 110 by a leakage current. More particularly, when the voltage across the varistor 110 exceeds the nominal clamping voltage VNOM, a leakage current will pass through the varistor 110 and generate heat therein from ohmic losses. This may occur because the VNOM has dropped due to varistor 110 aging and/or because the voltage applied by the circuit across the device 100 has increased.

Figure 5:
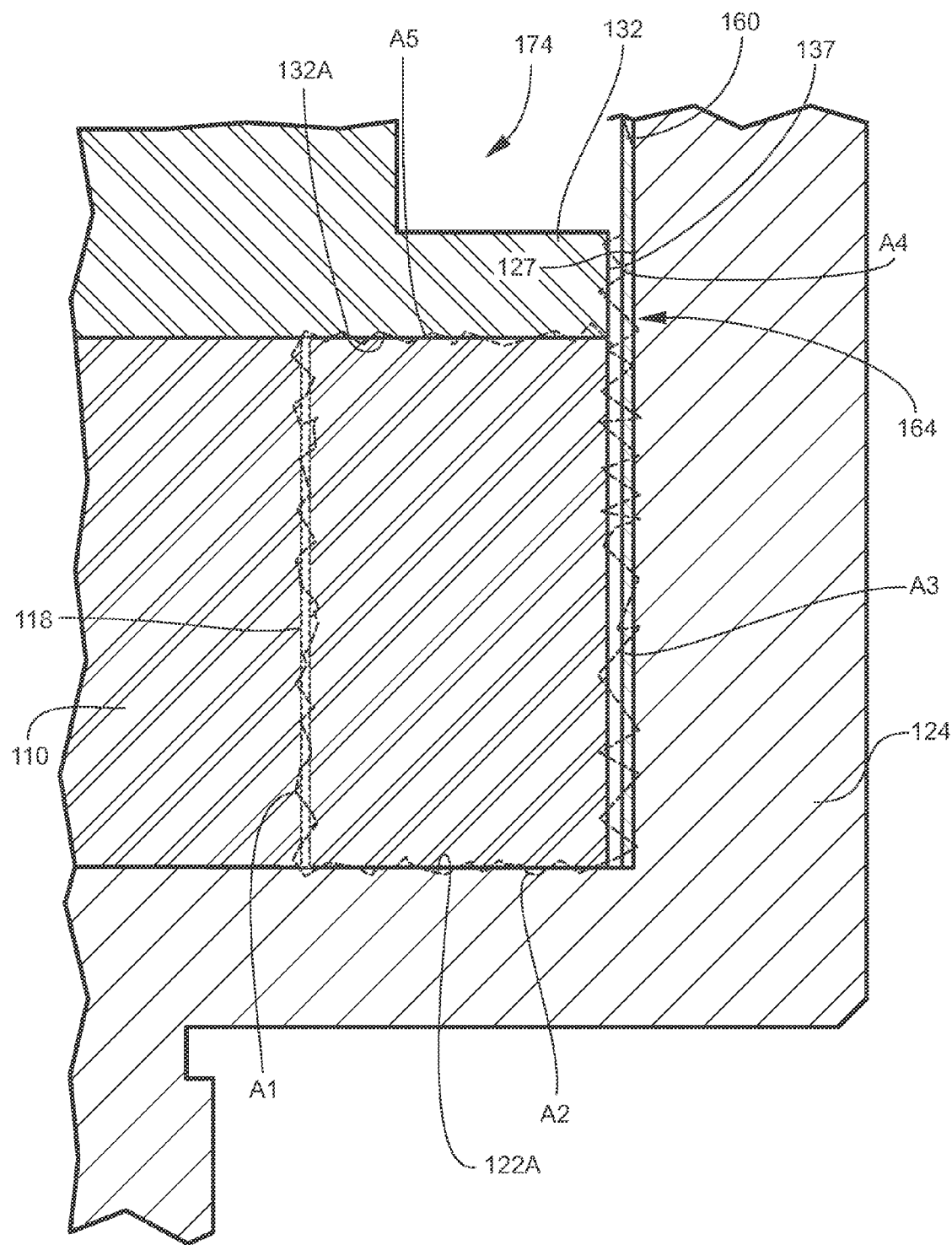
FIG. 5 is an enlarged, fragmentary, cross-sectional view of the overvoltage protection device of FIG. 1 taken along the line 3-3 illustrating a failure site in a varistor wafer and arcs propagating through the overvoltage protection device.

The fail-safe system 141 can also be triggered when the varistor 110 fails as a short circuit. In this case, the varistor 110 will generate heat from a fault current through the short circuit failure site (e.g., a pinhole 118 as illustrated in FIG. 5). The fault current generates heat (from high localized ohmic loss heating at the pinhole) in and adjacent the varistor 110. As discussed below, a fail-short varistor may trigger the first fail-safe system 161 instead of the second fail-safe system 141, depending on the magnitude of the fault current and other conditions.

Figure 6:
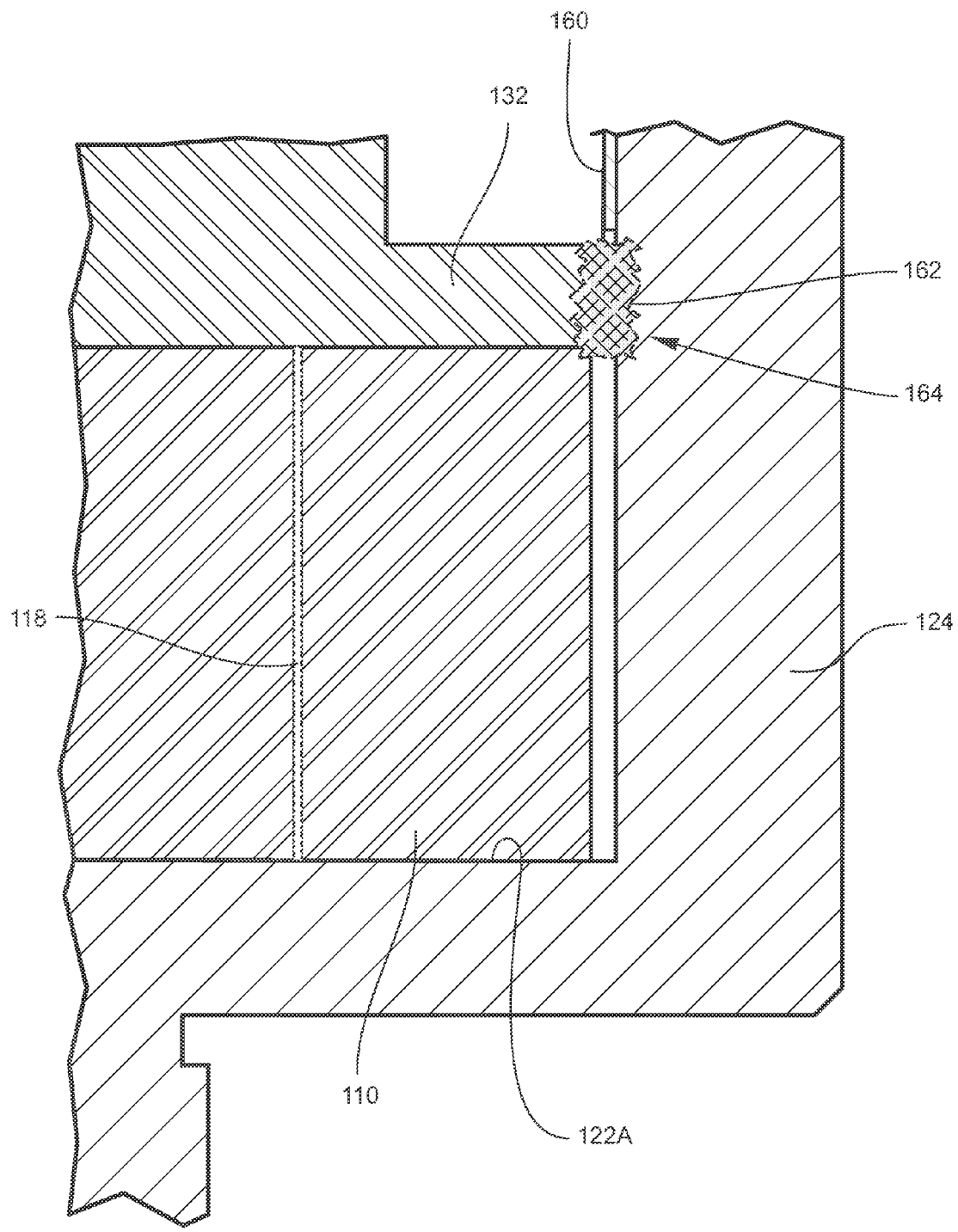
FIG. 6 is an enlarged, fragmentary, cross-sectional view of the overvoltage protection device of FIG. 1 taken along the line 3-3, wherein a fused interface has been formed by the arcing of FIG. 5 to bypass the varistor wafer.

With reference to FIGS. 3, 5 and 6, the first fail-safe system 161 can be triggered when the varistor 110 fails as a short circuit. In this case, arcing will occur adjacent and within a short circuit failure site 118. More particularly, the arcing will occur between the varistor 110 and one or both of the electrodes 120, 130 at the varistor-electrode contact interfaces 112/122A, 114/132A. The arcing will propagate radially outwardly toward the housing sidewall 124. The arcing may travel from the electrode wall 122 of the housing 120 up the housing sidewall 120 (i.e., with the arc extending between the varistor sidewall 116 and the housing sidewall 124) and/or may travel from the varistor upper contact face 114 to the sidewall 132C of the electrode head 132. Ultimately, the arcing propagates up the housing sidewall 124 such that arcing occurs directly between the outer peripheral sidewall 132C of the electrode head 132 and the adjacent surface of the housing sidewall 124. This latter arcing causes a metal surface portion 137 of the head sidewall 132C and a metal surface portion 127 of the housing sidewall 124 to fuse or bond directly to one another in a prescribed region at a bonding or fusing site 164 to form a bonded or fused interface portion, or region 162 (FIG. 6). For example, FIG. 5 shows an exemplary varistor short circuit failure site or pinhole 118 wherein an electric arc A1 has been generated by a fault current. The arc A1 may propagate as an arc A2 along the housing contact surface 122A and up the sidewall 124 as an arc A3 (across, the gap G1 from the varistor sidewall surface 116 to the sidewall 124 surface) to ultimately form an arc A4 at the fusing site 164. The arc A4 fuses or bonds the surfaces and portions 127, 137. Alternatively or additionally, the arc A1 may propagate as an arc A5 along the electrode contact surface 132A to ultimately form the arc A4 at the fusing site 164. In some embodiments, the electrodes are both formed of aluminum or aluminum alloy, so that the bond is direct aluminum-to-aluminum, which can provide particularly low ohmic resistance. The fusing or bonding may occur by welding induced by the arc. In this way, the electrodes 120, 130 are shorted at the interface 162 to bypass the varistor 110 so that the current induced heating of the varistor 110 ceases.

The electrical insulation membrane 160 is provided between the housing sidewall 124 and the electrode head 132 and the varistor 110 to provide electrical isolation in normal operation. However, the membrane 160 is formed of a material that is quickly melted or vaporized by the arcing so that the membrane 160 does not unduly impede the propagation of the arc or the bonding of the electrodes 120, 130 as described.

The chamber 174 provides a break between the adjacent surfaces of the electrode 130 and the housing 120 to extinguish the electric arc (i.e., to prevent the arc from continuing up the sidewall 124). The chamber 174 reduces the time required to terminate the arc and facilitates more rapid formation of the bonded interface 162.

In the event of a fail-short varistor, either of the first and second fail-safe systems 161, 141 may be triggered or activated, in which case it is unlikely that the other will be. The first fail-safe system 161 requires a fault current sufficient to create the arcing, whereas the second fail-safe system 141 does not. When sufficient fault current is present to create the arcing, the first fail-safe system 161 will typically execute and form the electrode short circuit before the second fail-safe system 141 can form the meltable member short. However, if the applied current is insufficient to generate the arcing, the fault current will continue to heat the device 100 until the second fail-safe system 141 is activated. Thus, where a fail-short varistor is the trigger, the second fail-safe system 141 will operate for relatively low current and the first fail-safe system 161 will operate for relatively high current.

Thus, the meltable member 140A and the fused interface 162 each provide a direct electrical contact surface or a low resistance bridge between the electrode 130 and the housing 120 and an enlarged current flow path (i.e., a lower resistance short circuit) via the meltable member 140A or the fused site 162. In this way, the fault or leakage current is directed away from the varistor 110. The arcing, ohmic heating and/or other phenomena inducing heat generation are diminished or eliminated, and thermal runaway and/or excessive overheat of the device 100 can be prevented. The device 100 may thereby convert to a relatively low resistance element capable of maintaining a relatively high current safely (i.e., without catastrophic destruction of the device). The fail-safe systems 141, 161 can thus serve to protect the device 100 from catastrophic failure during its end of life mode. The present invention can provide a safe end of life mechanism for a varistor-based overvoltage device. It will be appreciated that the device 100 may be rendered unusable thereafter as an overvoltage protection device, but catastrophic destruction (e.g., resulting in combustion temperature, explosion, or release of materials from the device 100) is avoided.

According to some embodiments, the meltable member 140A bypass and the fused interface 162 bypass each have an ohmic resistance of less than about 1 mOhm.

In some embodiments, the device 100 may be effectively employed in any orientation. For example, the device 100 may be deployed in a vertical orientation or a horizontal orientation. When the meltable member 140 is melted by an overheat generation event, the meltable member 140 will flow to the lower portion of the chamber 176 where it forms a reconfigured meltable member (which may be molten in whole or in part) that bridges the electrode 130 and the housing 120 as discussed above. The chamber 176 is sealed so that the molten meltable member 140 does not flow out of the chamber 176.

Figure 7:
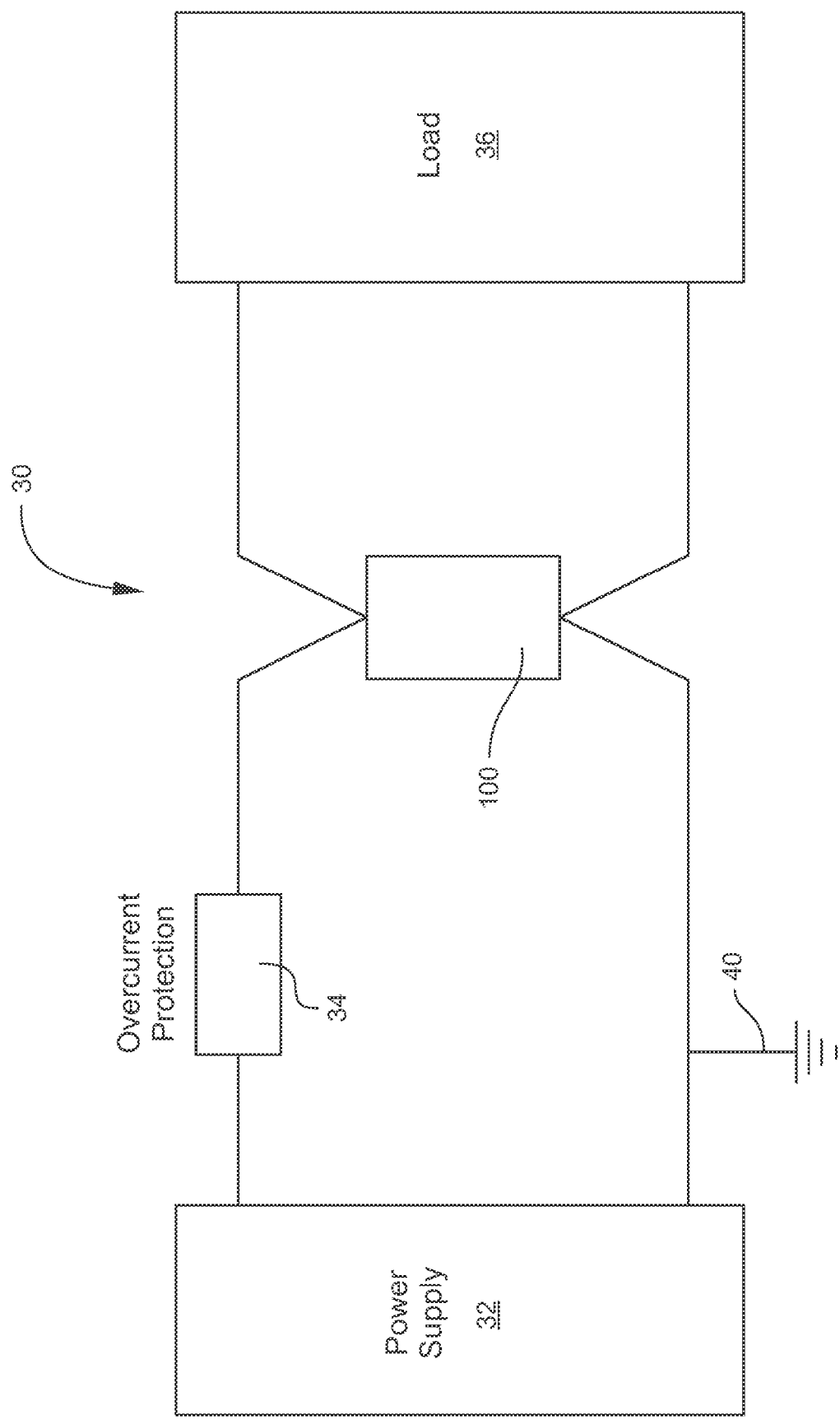
FIG. 7 is a schematic diagram representing a circuit including the overvoltage protection device of FIG. 1 according to embodiments of the present invention.

With reference to FIG. 7, an electrical circuit 30 according to embodiments of the present invention is shown schematically therein. The circuit 30 includes a power supply 32, an overcurrent protection device (e.g., a circuit breaker 34), a protected load 36, ground 40, and the overvoltage protection device 100. The device 100 may be mounted in an electrical service utility box, for example. The power supply 32 may be an AC or DC supply and provides power to the load 36. The load 36 may be any suitable device, system, equipment or the like (e.g., an electrical appliance, a cellular communications transmission tower, etc.). The device 100 is connected in parallel with the load 36. In normal use, the device 100 will operate as an open circuit so that current is directed to the load 36. In an overvoltage event, the resistance of the varistor wafer will drop rapidly so that overcurrent is prevented from damaging the load 36. The circuit breaker 34 may trip open. However, in some cases, the device 100 may be subjected to a current exceeding the capacity of the varistor wafer 110, causing excessive heat to be generating by arcing, etc. as described above. The fail-safe system 141 or the fail-safe system 161 will actuate to short circuit the device 100 as discussed above. The short circuiting of the device 100 will in turn trip the circuit breaker 34 to open. In this manner, the load 36 may be protected from a power surge or overcurrent event. Additionally, the device 100 may safely conduct a continuous current.

Notably, the device 100 will continue to short circuit the circuit 30 following the overcurrent event. As a result, the circuit breaker 34 cannot be reset, which notifies an operator that the device 100 must be repaired or replaced. If, alternatively, the branch of the device 100 were interrupted rather than short circuited, the circuit breaker 34 could be closed and the operator may be unaware that the load 36 is no longer protected by a functional overvoltage protection device.

Overvoltage protection devices according to embodiments of the present invention (e.g., the device 100) may provide a number of advantages in addition to those mentioned above. The devices may be formed so to have a relatively compact form factor. The devices may be retrofittable for installation in place of similar type overvoltage protection devices not having a meltable member as described herein. In particular, the present devices may have the same length dimension, as such previous devices.

According to some embodiments, overvoltage protection devices of the present invention (e.g., the device 100) are adapted such that when the fail-safe system 141 or the fail-safe system 161 is triggered to short circuit the overvoltage protection device, the conductivity of the overvoltage protection device is at least as great as the conductivity of the feed and exit cables connected to the device.

According to some embodiments, overvoltage protection devices of the present invention (e.g., the device 100) are adapted to sustain a current of 1000 amps for at least seven hours without occurrence of a breach of the housing (e.g., the housing 120 or 220) or achieving an external surface temperature in excess of 80 degrees Kelvin.

Overvoltage protection devices (e.g., the device 100) as disclosed herein can be particularly well-suited or advantageous when employed in a direct current (DC) circuit or system where the current conducted by the varistor 110 is very high. According to some embodiments, the device 100 is configured such that, when the fail-safe system 161 is triggered, the device 100 can withstand a short circuit current of at least 2 kA for more than 200 ms, and a permanent current flow of at least 700 A without overheating. The maximum temperature rise should not be more than 120 degrees Kelvin and the temperature rise five minutes after the failure of the device should not exceed 80 degrees Kelvin during the permanent current flow.

While meltable member 140 as described above is mounted so that it surrounds and is in contact with the electrode 130, according to other embodiments of the present invention, a meltable member may instead or additionally be mounted elsewhere in a device. For example, a meltable member (e.g., a sleeve or liner of the meltable material) may be mounted on the inner surface of the sidewall 124 and/or the underside of the flange 138. Likewise, the meltable member may be shaped differently in accordance with some embodiments of the invention. For example, according to some embodiments, the meltable member is not tubular and/or symmetric with respect to the chamber, the electrode, and/or the housing.

According to some embodiments, the areas of engagement between each of the contact surfaces (e.g., the contact surfaces 122A, 132A) and the varistor wafer surfaces (e.g., the wafer surfaces 112, 114) is at least 0.5 square inches.

According to some embodiments, the biased electrodes 120, 130 apply a load to the varistor 110 in the range of from 100 lbf and 1000 lbf depending on its surface area.

According to some embodiments, the combined thermal mass of the housing 120 and the electrode 130 is substantially greater than the thermal mass of the varistor wafer 110. As used herein, the term "thermal mass" means the product of the specific heat of the material or materials of the object (e.g., the varistor wafer 110) multiplied by the mass or masses of the material or materials of the object. That is, the thermal mass is the quantity of energy required to raise one gram of the material or materials of the object by one degree centigrade times the mass or masses of the material or materials in the object. According to some embodiments, the thermal mass of at least one of the electrode head 132 and the electrode wall 122 is substantially greater than the thermal mass of the varistor wafer 110. According to some embodiments, the thermal mass of at least one of the electrode head 132 and the electrode wall 122 is at least two times the thermal mass of the varistor wafer 110, and, according to some embodiments, at least ten times as great. According to some embodiments, the combined thermal masses of the head 132 and the wall 122 are substantially greater than the thermal mass of the varistor wafer 110, according to some embodiments at least two times the thermal mass of the wafer 110 and, according to some embodiments, at least ten times as great.

Methods for forming the several components of the overvoltage protection devices of the present invention will be apparent to those of skill in the art in view of the foregoing description. For example, the housing 120, the electrode 130, and the end cap 152 may be formed by machining, casting or impact molding. Each of these elements may be unitarily formed or formed of multiple components fixedly joined, by welding, for example.

Multiple varistor wafers (not shown) may be stacked and sandwiched between the electrode head and the center wall. The outer surfaces of the uppermost and lowermost varistor wafers would serve as the wafer contact surfaces. However, the properties of the varistor wafer are preferably modified by changing the thickness of a single varistor wafer rather than stacking a plurality of varistor wafers.

As discussed above, the spring washers 146 are Belleville washers. Belleville washers may be used to apply relatively high loading without requiring substantial axial space. However, other types of biasing means may be used in addition to or in place of the Belleville washer or washers. Suitable alternative biasing means include one or more coil springs, wave washers or spiral washers.

Many alterations and modifications may be made by those having ordinary skill in the art, given the benefit of present disclosure, without departing from the spirit and scope of the invention. Therefore, it must be understood that the illustrated embodiments have been set forth only for the purposes of example, and that it should not be taken as limiting the invention as defined by the following claims. The following claims, therefore, are to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

What is claimed is:

1. An overvoltage protection device comprising:
   first and second electrically conductive electrode members;
   a varistor member formed of a varistor material and electrically connected with each of the first and second electrode members; and
   an integral fail-safe mechanism operative to electrically short circuit the first and second electrode members about the varistor member by fusing first and second metal surfaces in the overvoltage protection device to one another using an electric arc;
   wherein:
   the first and second metal surfaces are separated by a gap;
   the overvoltage protection device further includes an electrically insulating spacer member electrically isolating the first and second metal surfaces from one another; and
   the electric arc disintegrates the spacer member and extends across the gap to fuse the first and second metal surfaces.

2. The overvoltage protection device of claim 1 wherein the fail-safe mechanism is operative to electrically short circuit the first and second electrode members about the varistor member by fusing the first and second metal surfaces in response to a short circuit failure of the varistor member.

3. The overvoltage protection device of claim 1 wherein:
the first and second metal surfaces are separated by a gap having a width in the range of from about 0.2 mm to 1 mm; and
the electric arc extends across the gap to fuse the first and second metal surfaces.

4. The overvoltage protection device of claim 1 wherein the spacer member is formed of a polymeric material having a thickness in the range of from about 0.1 mm to 0.5 mm.

5. The overvoltage protection device of claim 1 wherein the first metal surface is a surface of the first electrode member and the second metal surface is a surface of the second electrode member.

6. The overvoltage protection device of claim 5 wherein:
the first electrode includes a housing having a metal housing sidewall and defining a housing chamber;
the varistor member and at least a portion of the second electrode are disposed in the housing chamber; and
the first metal surface is a surface of the housing sidewall.

7. The overvoltage protection device of claim 6 wherein:
the varistor member has first and second opposed, generally planar varistor contact surfaces;
the housing includes an electrode wall having a first electrode contact surface engaging the first varistor contact surface;
the second electrode includes a head positioned in the housing chamber, the head including a second electrode contact surface engaging the second varistor contact surface and a head peripheral surface surrounding the second electrode contact surface; and
the second metal surface is located on the head peripheral surface.

8. The overvoltage protection device of claim 7 including a buffer chamber on a side of the head opposite the second electrode contact surface, wherein the buffer chamber is configured to limit propagation of electric arc away from the head.

9. The overvoltage protection device of claim 1 including a biasing device biasing at least one of the first and second electrode members against the varistor member.

10. The overvoltage protection device of claim 1 wherein the fail-safe mechanism is a first fail-safe mechanism and further including an integral second fail-safe mechanism, the second fail-safe mechanism including an electrically conductive meltable member, wherein the meltable member is responsive to heat in the overvoltage protection device to melt and form a current flow path between the first and second electrode members through the meltable member.

11. The overvoltage protection device of claim 10 wherein: the meltable member has a greater melting point temperature than a melting point temperature of the spacer member.

12. The overvoltage protection device of claim 10 wherein:
the first fail-safe mechanism is operative to fuse the first and second metal surfaces at a prescribed region; and
the overvoltage protection device includes a sealing member between the prescribed region and the meltable member.

13. The overvoltage protection device of claim 10 wherein:
the first fail-safe mechanism is operative to electrically short circuit the first and second electrode members about the varistor member by fusing the first and second metal surfaces in response to a short circuit failure of the varistor member sufficient to generate an arc; and
the second fail-safe mechanism is operative to electrically short circuit the first and second electrode members about the varistor member in response to a short circuit failure of the varistor member not sufficient to generate an arc.

14. The overvoltage protection device of claim 1 wherein:
the fail-safe mechanism is a first fail-safe mechanism;
the first fail-safe mechanism is operative to electrically short circuit the first and second electrode members about the varistor member by fusing the first and second metal surfaces in response to a short circuit failure of the varistor member;
the overvoltage protection device further includes an integral second fail-safe mechanism, the second fail-safe mechanism including an electrically conductive meltable member, wherein the meltable member is responsive to heat in the overvoltage protection device to melt and form a current flow path between the first and second electrode members through the meltable member;
the first fail-safe mechanism is operative to electrically short circuit the first and second electrode members about the varistor member by fusing the first and second metal surfaces in response to a short circuit failure of the varistor member sufficient to generate an arc;
the second fail-safe mechanism is operative to electrically short circuit the first and second electrode members about the varistor member in response to a short circuit failure of the varistor member that is not sufficient to generate an arc;
the varistor member has first and second opposed, generally planar varistor contact surfaces;
the first electrode includes a housing defining a housing chamber and having a metal housing sidewall and an electrode wall, the electrode wall having a first electrode contact surface engaging the first varistor contact surface;
the varistor member is disposed in the housing chamber;
the second electrode includes a head positioned in the housing chamber, the head including a second electrode contact surface engaging the second varistor contact surface and a head peripheral surface surrounding the second electrode contact surface;
the first metal surface is a surface of the housing sidewall;
the second metal surface is located on the head peripheral surface;
the gap separating the first and second metal surfaces has a width in the range of from about 0.2 mm to 1 mm; and
the spacer member is formed of a polymeric material having a thickness in the range of from about 0.1 mm to 0.5 mm.

15. A method for providing an overvoltage protection, the method comprising:
providing an overvoltage protection device including:
first and second electrically conductive electrode members;
a varistor member formed of a varistor material and electrically connected with each of the first and second electrode members; and
an integral fail-safe mechanism operative to electrically short circuit the first and second electrode members about the varistor member by fusing the first and second metal surfaces in the overvoltage protection device to one another using an electric arc; and
directing current between the first and second electrode members through the varistor member during an overvoltage event;

wherein:
the first and second metal surfaces are separated by a gap;
the overvoltage protection device further includes an electrically insulating spacer member electrically isolating the first and second metal surfaces from one another; and
the electric arc disintegrates the spacer member and extends across the gap to fuse the first and second metal surfaces.

16. An overvoltage protection device comprising:
first and second electrically conductive electrode members;
a varistor member formed of a varistor material and electrically connected with each of the first and second electrode members;
an integral first fail-safe mechanism configured to electrically short circuit the first and second electrode members about the varistor member when triggered by a first set of operating conditions; and
an integral second fail-safe mechanism configured to electrically short circuit the first and second electrode members about the varistor member when triggered by a second set of operating conditions different from the first set of operating conditions.

17. The overvoltage protection device of claim 16 wherein the first and second sets of operating conditions each include at least one of an overheating event and an arcing event.

18. The overvoltage protection device of claim 17 wherein:
the first set of operating conditions includes an arcing event; and
the second set of operating conditions includes an overheating event.

19. A method for providing an overvoltage protection, the method comprising:
providing an overvoltage protection device including:
first and second electrically conductive electrode members;
a varistor member formed of a varistor material and electrically connected with each of the first and second electrode members;
an integral first fail-safe mechanism configured to electrically short circuit the first and second electrode members about the varistor member when triggered by a first set of operating conditions; and
an integral second fail-safe mechanism configured to electrically short circuit the first and second electrode members about the varistor member when triggered by a second set of operating conditions different from the first set of operating conditions; and
directing current between the first and second electrode members through the varistor member during an overvoltage event.

20. An overvoltage protection device comprising:
first and second electrically conductive electrode members;
a varistor member formed of a varistor material and electrically connected with each of the first and second electrode members; and
an integral fail-safe mechanism operative to electrically short circuit the first and second electrode members about the varistor member by fusing first and second metal surfaces in the overvoltage protection device to one another using an electric arc;
wherein:
the first and second metal surfaces are separated by a gap having a width in the range of from about 0.2 mm to 1 mm; and
the electric arc extends across the gap to fuse the first and second metal surfaces.

21. The overvoltage protection device of claim 20 wherein the fail-safe mechanism is operative to electrically short circuit the first and second electrode members about the varistor member by fusing the first and second metal surfaces in response to a short circuit failure of the varistor member.

22. The overvoltage protection device of claim 20 wherein the first metal surface is a surface of the first electrode member and the second metal surface is a surface of the second electrode member.

23. The overvoltage protection device of claim 22 wherein:
the first electrode includes a housing having a metal housing sidewall and defining a housing chamber;
the varistor member and at least a portion of the second electrode are disposed in the housing chamber; and
the first metal surface is a surface of the housing sidewall.

24. The overvoltage protection device of claim 23 wherein:
the varistor member has first and second opposed, generally planar varistor contact surfaces;
the housing includes an electrode wall having a first electrode contact surface engaging the first varistor contact surface;
the second electrode includes a head positioned in the housing chamber, the head including a second electrode contact surface engaging the second varistor contact surface and a head peripheral surface surrounding the second electrode contact surface; and
the second metal surface is located on the head peripheral surface.

25. The overvoltage protection device of claim 24 including a buffer chamber on a side of the head opposite the second electrode contact surface, wherein the buffer chamber is configured to limit propagation of electric arc away from the head.

26. The overvoltage protection device of claim 20 including a biasing device biasing at least one of the first and second electrode members against the varistor member.

27. The overvoltage protection device of claim 20 wherein the fail-safe mechanism is a first fail-safe mechanism and further including an integral second fail-safe mechanism, the second fail-safe mechanism including an electrically conductive meltable member, wherein the meltable member is responsive to heat in the overvoltage protection device to melt and form a current flow path between the first and second electrode members through the meltable member.

28. The overvoltage protection device of claim 27 wherein:
the overvoltage protection device further includes an electrically insulating spacer member electrically isolating the first and second metal surfaces from one another; and
the meltable member has a greater melting point temperature than a melting point temperature of the spacer member.

29. The overvoltage protection device of claim 27 wherein:
the first fail-safe mechanism is operative to fuse the first and second metal surfaces at a prescribed region; and
the overvoltage protection device includes a sealing member between the prescribed region and the meltable member.

30. The overvoltage protection device of claim 27 wherein:
the first fail-safe mechanism is operative to electrically short circuit the first and second electrode members about the varistor member by fusing the first and second metal surfaces in response to a short circuit failure of the varistor member sufficient to generate an arc; and the second fail-safe mechanism is operative to electrically short circuit the first and second electrode members about the varistor member in response to a short circuit failure of the varistor member not sufficient to generate an arc.

31. An overvoltage protection device comprising:

first and second electrically conductive electrode members;

a varistor member formed of a varistor material and electrically connected with each of the first and second electrode members; and an integral fail-safe mechanism operative to electrically short circuit the first and second electrode members about the varistor member by fusing first and second metal surfaces in the overvoltage protection device to one another using an electric arc;

wherein:
- the first metal surface is a surface of the first electrode member and the second metal surface is a surface of the second electrode member;
- the first electrode includes a housing having a metal housing sidewall and defining a housing chamber;
- the varistor member and at least a portion of the second electrode are disposed in the housing chamber;
- the first metal surface is a surface of the housing sidewall;
- the varistor member has first and second opposed, generally planar varistor contact surfaces;
- the housing includes an electrode wall having a first electrode contact surface engaging the first varistor contact surface;
- the second electrode includes a head positioned in the housing chamber, the head including a second electrode contact surface engaging the second varistor contact surface and a head peripheral surface surrounding the second electrode contact surface;
- the second metal surface is located on the head peripheral surface; and
- the overvoltage protection device includes a buffer chamber on a side of the head opposite the second electrode contact surface, wherein the buffer chamber is configured to limit propagation of electric arc away from the head.

32. An overvoltage protection device comprising:

first and second electrically conductive electrode members;

a varistor member formed of a varistor material and electrically connected with each of the first and second electrode members; and an integral first fail-safe mechanism operative to electrically short circuit the first and second electrode members about the varistor member by fusing first and second metal surfaces in the overvoltage protection device to one another using an electric arc; and an integral second fail-safe mechanism, the second fail-safe mechanism including an electrically conductive meltable member, wherein the meltable member is responsive to heat in the overvoltage protection device to melt and form a current flow path between the first and second electrode members through the meltable member.

33. The overvoltage protection device of claim 32 wherein:

the overvoltage protection device further includes an electrically insulating spacer member electrically isolating the first and second metal surfaces from one another; and the meltable member has a greater melting point temperature than a melting point temperature of the spacer member.

34. The overvoltage protection device of claim 32 wherein:

the first fail-safe mechanism is operative to fuse the first and second metal surfaces at a prescribed region; and the overvoltage protection device includes a sealing member between the prescribed region and the meltable member.

35. The overvoltage protection device of claim 32 wherein:

the first fail-safe mechanism is operative to electrically short circuit the first and second electrode members about the varistor member by fusing the first and second metal surfaces in response to a short circuit failure of the varistor member sufficient to generate an arc; and the second fail-safe mechanism is operative to electrically short circuit the first and second electrode members about the varistor member in response to a short circuit failure of the varistor member not sufficient to generate an arc.

* * * * *